US008950524B2

(12) United States Patent
Lin et al.

(10) Patent No.: US 8,950,524 B2
(45) Date of Patent: Feb. 10, 2015

(54) ELECTRIC MOVING DEVICE FOR MOVING PATIENT BEDS

(71) Applicant: Sunpex Technology Co., Ltd., Chia Yi (TW)

(72) Inventors: Samuel Lin, Chia Yi (TW); Feng-Hui Liao, Chia Yi (TW); Kuo-Jong Yang, Chia Yi (TW); Kun-An Huang, Chia Yi (TW)

(73) Assignee: Sunpex Technology Co., Ltd., Chia Yi (TW)

( * ) Notice: Subject to any disclaimer, the term of this patent is extended or adjusted under 35 U.S.C. 154(b) by 42 days.

(21) Appl. No.: 13/930,555

(22) Filed: Jun. 28, 2013

(65) Prior Publication Data

US 2015/0000989 A1 Jan. 1, 2015

(51) Int. Cl.
*B62D 51/04* (2006.01)
*A61G 7/08* (2006.01)

(52) U.S. Cl.
CPC ........................................ *A61G 7/08* (2013.01)
USPC ........................................................ 180/19.1

(58) Field of Classification Search
USPC ........................................ 180/19.1, 19.2, 19.3
See application file for complete search history.

(56) References Cited

U.S. PATENT DOCUMENTS

| | | | | |
|---|---|---|---|---|
| 6,938,711 | B2 * | 9/2005 | Kime et al. | 180/11 |
| 7,021,407 | B2 * | 4/2006 | Ruschke et al. | 180/11 |
| 7,340,784 | B2 * | 3/2008 | Stryker et al. | 5/81.1 HS |
| 8,516,637 | B2 * | 8/2013 | Karwal et al. | 5/608 |
| 8,602,136 | B2 * | 12/2013 | Altena et al. | 180/19.3 |
| 8,627,909 | B2 * | 1/2014 | Chang et al. | 180/19.2 |

FOREIGN PATENT DOCUMENTS

| | | |
|---|---|---|
| TW | 360532 | 1/1987 |

* cited by examiner

*Primary Examiner* — Kevin Hurley
(74) *Attorney, Agent, or Firm* — Rosenberg, Klein & Lee

(57) ABSTRACT

An electric moving device for moving patient beds includes a power unit, a holding unit and a control unit. The power unit is connected to the underside of the moving device and the holding unit is connected to two columns of the moving device so as to connect the moving device with the bed. By operating the control unit to control the power unit, the bed is moved from one place to another by the moving device. Medical equipment is able to go with the moving device to provide sufficient caring surface to the patient.

14 Claims, 10 Drawing Sheets

ELECTRIC MOVING DEVICE FOR MOVING PATIENT BEDS

BACKGROUND OF THE INVENTION

1. Fields of the invention

The present invention relates to an electric moving device, and more particularly, to an electric moving device for carrying and moving patient beds from one place to another.

2. Descriptions of Related Art

Taiwan Patent No. 360532 discloses a moving device which allows the patient bed to be moved from one room to Intensive Care Unit conveniently. The moving device has caring equipment and pressure regulation device carried therewith.

However, the moving device is moved manually so that there is a concern about the burden of labor. Besides, a latch unit is used to connect the moving device to the bed, and the latch unit is located on one side of the moving device so that the user has to move the moving device to a correct position to connect the bed to the moving device, and then the user moves to the pushing end of the moving device to move the moving device and the bed. This is inconvenient for the users. Furthermore, the conventional moving device cannot have more medical equipment installed thereon.

The present invention intends to provide an electric moving device for moving the patient beds and the electric moving device improves the shortcomings mentioned above.

SUMMARY OF THE INVENTION

The present invention relates to an electric moving device for moving patient beds, and the moving device comprises a support which has two columns on two sides thereof. At least one power unit has at least one electric motor, two active wheels and two casters, wherein the at least one electric motor has an output shaft connected with the two active wheels. The active wheels and the casters support the electric moving device. At least one holding unit is connected between the two columns and has a lever and a holding member. The holding member has a first plates and a second plate, the second plate is controlled by the lever to move toward or away from the first plate. A control unit is electrically connected to the at least one electric motor to activate or de-activate the at least one electric motor.

The electric moving device is able to hold the front end or the rear end of the bed by adjusting the distance between the first and second plates by operating the lever. The bed is then connected to the electric moving device, and the electric motor is activated to drive the active wheels to move the bed easily and conveniently. During the transportation of the bed, the patient is still under good medical care.

The primary object of the present invention is to provide an electric moving device for moving the patient bed more conveniently.

The second object of the present invention is to provide an electric moving device wherein the user of the moving device and the medical personals stand on different sides of the moving device, so that the connection of the moving device with the patient bed is easily and conveniently.

The third object of the present invention is to provide an electric moving device wherein the moving device is able to be equipped with racks for carrying more medical equipments.

The third object of the present invention is to provide an electric moving device wherein the moving device has a cushion which absorbs shocks during transportation.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
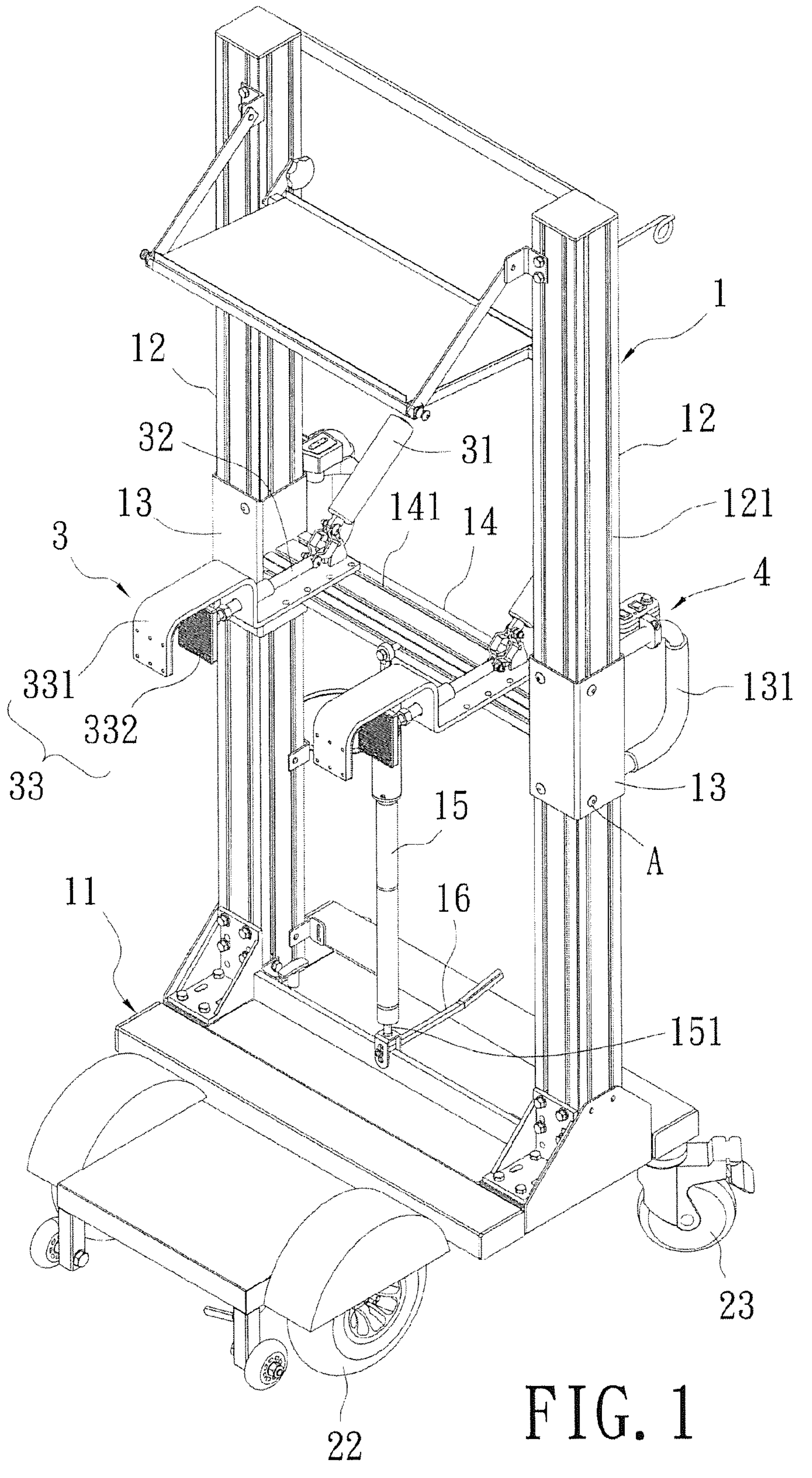
FIG. 1 is a perspective view to show the electric moving device of the present invention.
Figure 2:
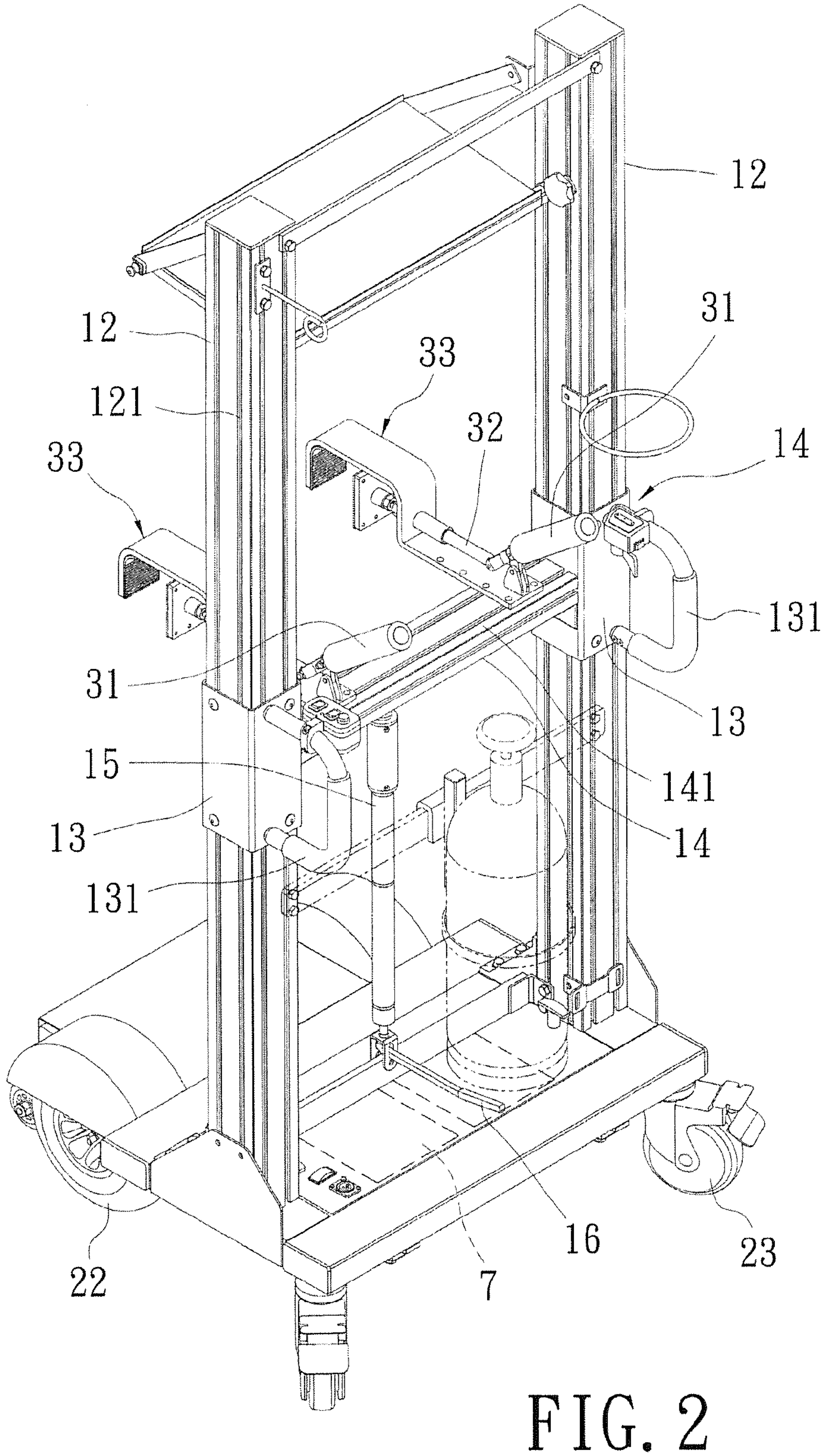
FIG. 2 is another perspective view to show the electric moving device of the present invention.

Referring to FIGS. 1 and 2, an electric moving device 1 of the present invention comprises a power unit 2, two holding units 3 and a control unit 4.

Figure 3:
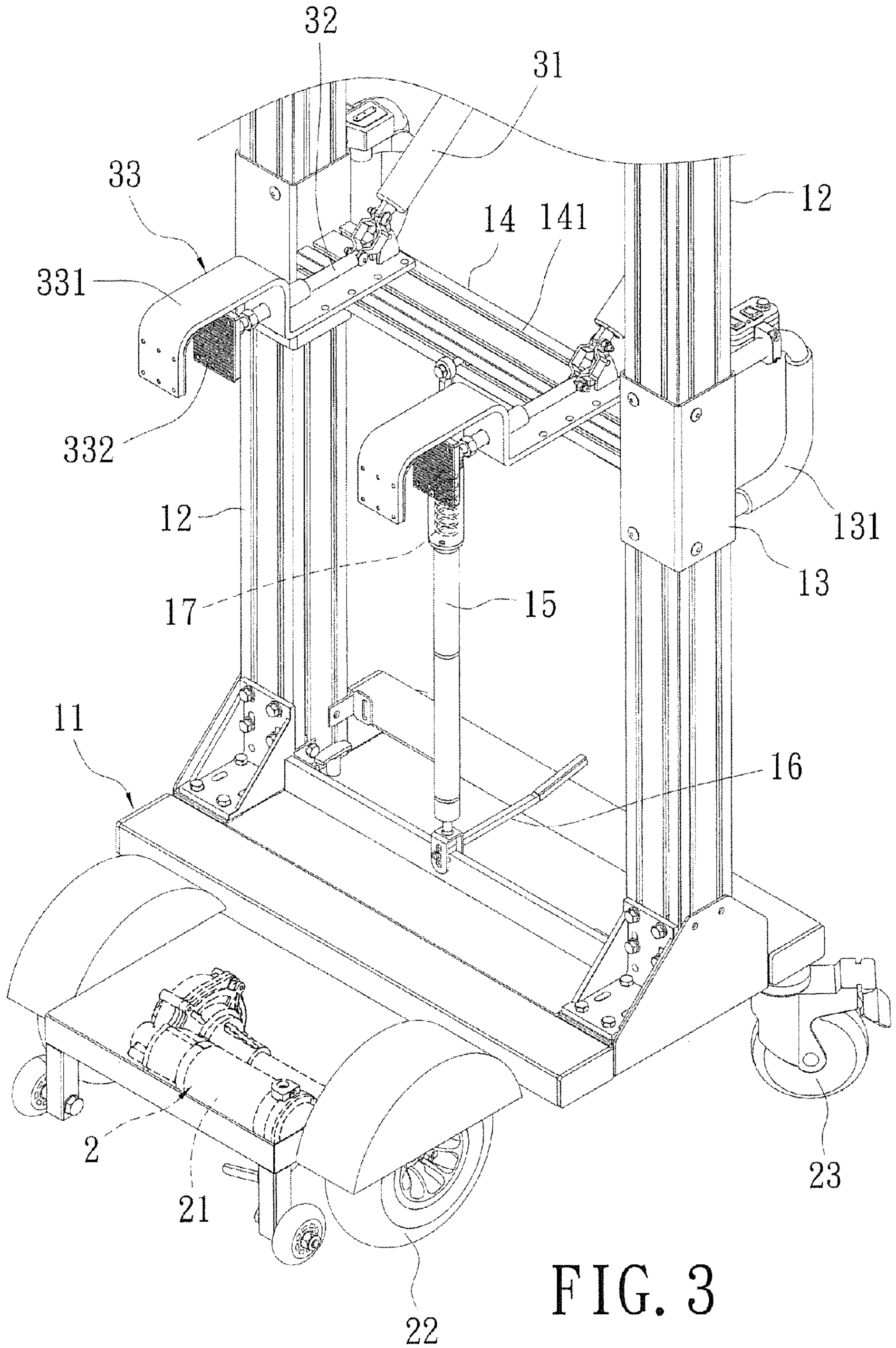
FIG. 3 is an enlarged perspective view to show a portion of the electric moving device of the present invention.

The moving device 1 has a support 11 which has two columns 12 on two sides thereof. Each of the two columns 12 has grooves 121 defined therein, the grooves 121 in the two columns 12 are located corresponding to each other. Two connection units 13 are connected to the grooves 121 of the two columns 12 respectively by two respective locking members "A" so that the two connection units 13 are connected to the two columns 12. A transverse bar 14 is connected between the two connection units 13 and has multiple slots 141 defined therein. A pneumatic bar 15 is connected between the support 11 and the transverse bar 14. A piston rod 151 of the pneumatic bar 15 is connected to an operation member 16 which controls the piston rod 151 to extend or retract relative to the pneumatic bar 15 so as to control the height of the transverse bar 14 between the two columns 12 according the height of the head board 51 of the bed 5. As shown in FIG. 3, the pneumatic bar 15 has a cushion 17 which absorbs shocks. Each of the two connection units 13 has a handle 131 for the users or medical personals to hold. The support 11 has an independent power supply unit 7 to provide electric power to medical equipments on the bed 5 and/or the moving device 1.

The power unit 2 comprises an electric motor 21, two active wheels 22 and two casters 23. The electric motor 21 is connected to the underside of the support 11 and the output shaft of the electric motor 21 is connected with the two active wheels 22. The active wheels 22 and the casters 23 support the electric moving device 1.

Figure 7:
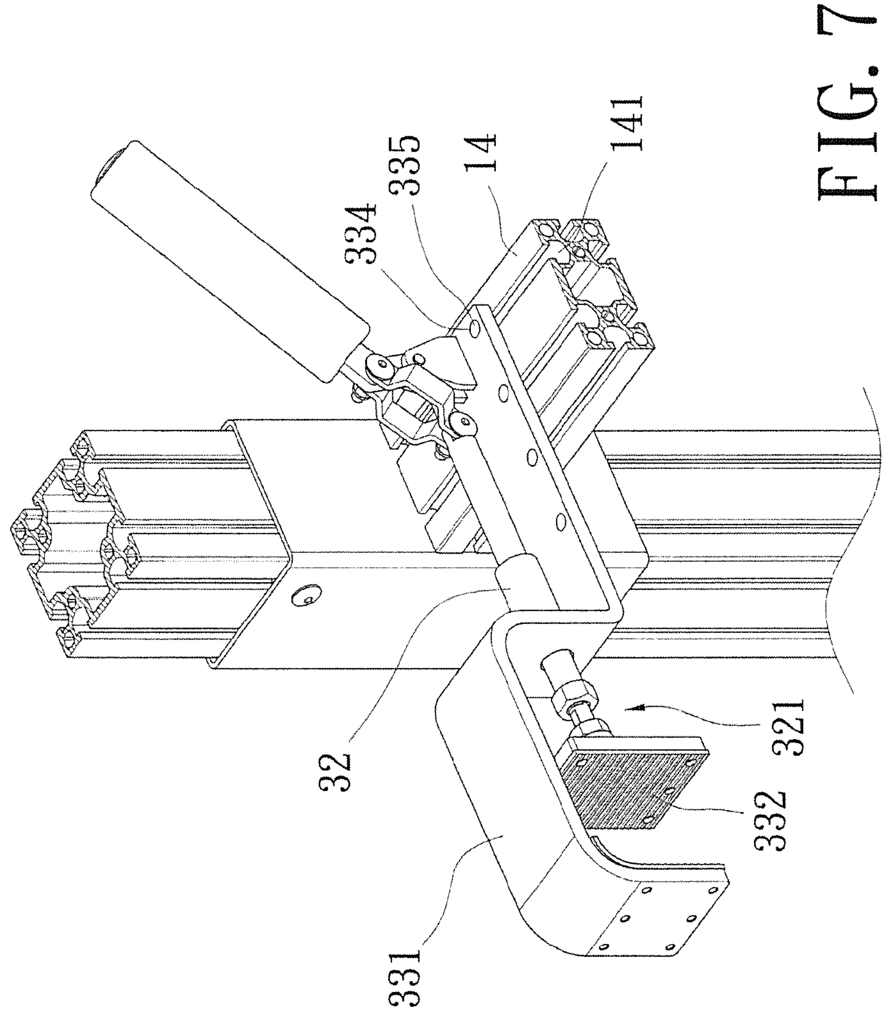
FIG. 7 is a perspective view to show the holding unit of the electric moving device of the present invention.
Figure 8:
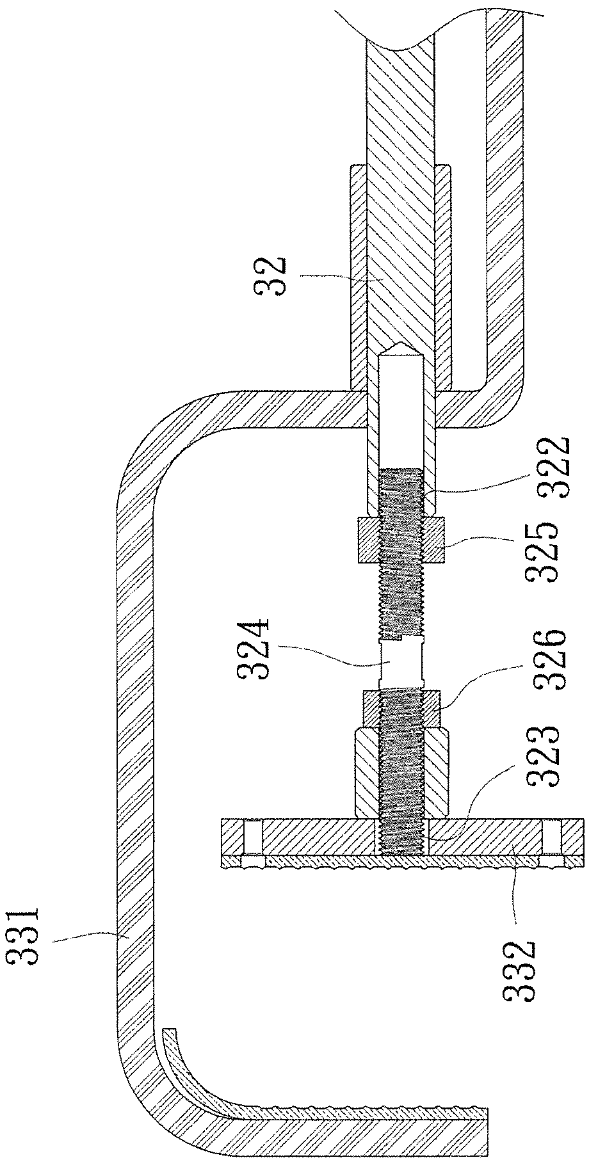
FIG. 8 is a cross sectional view to show the holding unit of the electric moving device of the present invention.
Figure 9:
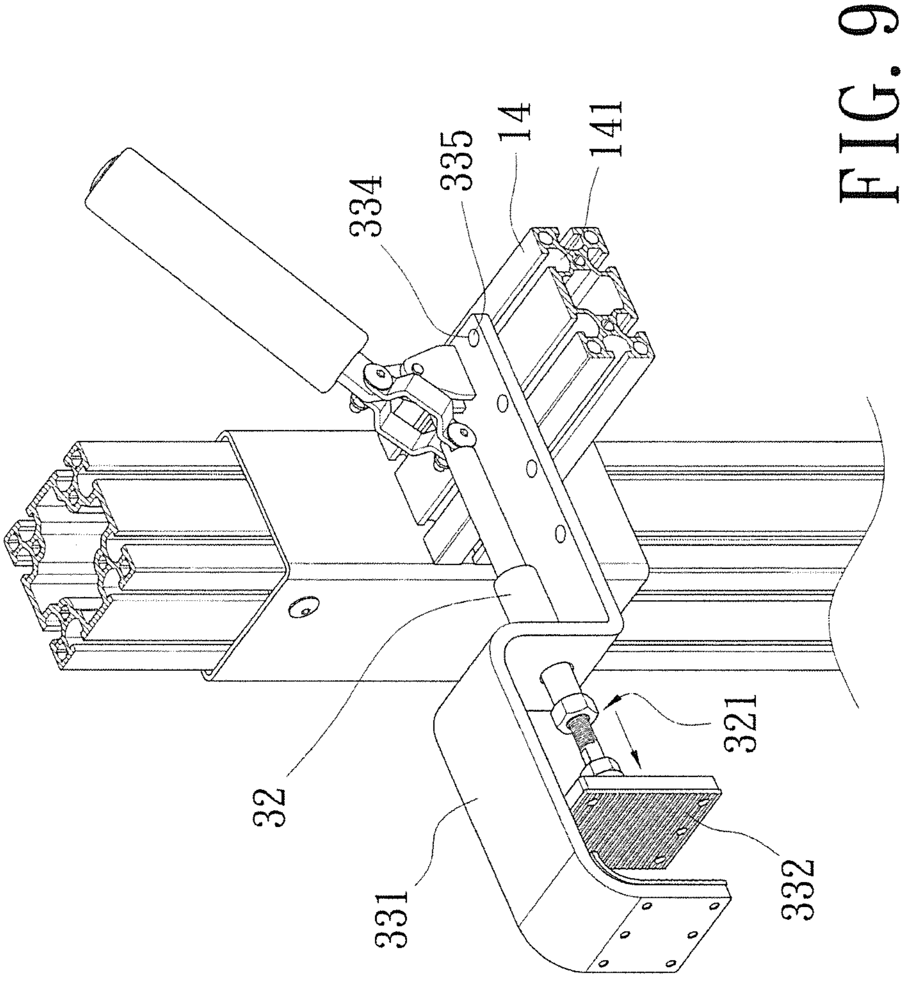
FIG. 9 is a perspective view to show the adjustment of the distance between the first and second plates of the holding unit of the electric moving device of the present invention.

As shown in FIG. 3, the holding unit 3 is connected between the two columns 12 and comprises a lever 31, a link 32 and a holding member 33. The holding member 33 has a first plate 331 and a second plate 332. The first end of the first plate 331 is connected to the slots 141 of the transverse bar 14 by the locking member 335. The lever 31 is pivotably connected to the first plate 331 and the link 32 by two respective shafts. The lever 31 is pivoted about the pivotal portion between the lever 31 and the first plate 331 to control the second plate 332 to move toward or away from the first plate 331 by the link 32. As shown in FIGS. 7 to 9, the first plate 331 has multiple locking holes 334, the multiple locking members 335 extend through the locking holes 334 and are connected to the slots 141 to adjust the length that the holding unit 3 extends beyond the transverse bar 14, such that the holding units 3 are moved to the best positions to be connected with the bed 5.

The link 32 has an adjustment unit 321 which adjusts the distance between the first and second plates 331, 332. The adjustment unit 321 has threaded holes 322 defined in the link 32 and threaded holes 323 defined in the second plate 332. A threaded rod 324 has positive threads defined in the first end thereof and negative threads defined in the second end of the threaded rod 324. The positive threads are connected to the threaded hole 322 of the link 32. The negative threads are connected to the threaded hole 323 of the second plate 332. Two nuts 325, 326 are respectively connected to the positive and negative threads beyond the threaded holes 322, 323. By adjusting either of the two nuts 325, 326 on the threaded rod 324, the length of the link 32 is adjusted so that the distance between the first and second plates 331, 332 is adjusted to meet the thickness of the head board 51 of the bed 5.

Figure 10:
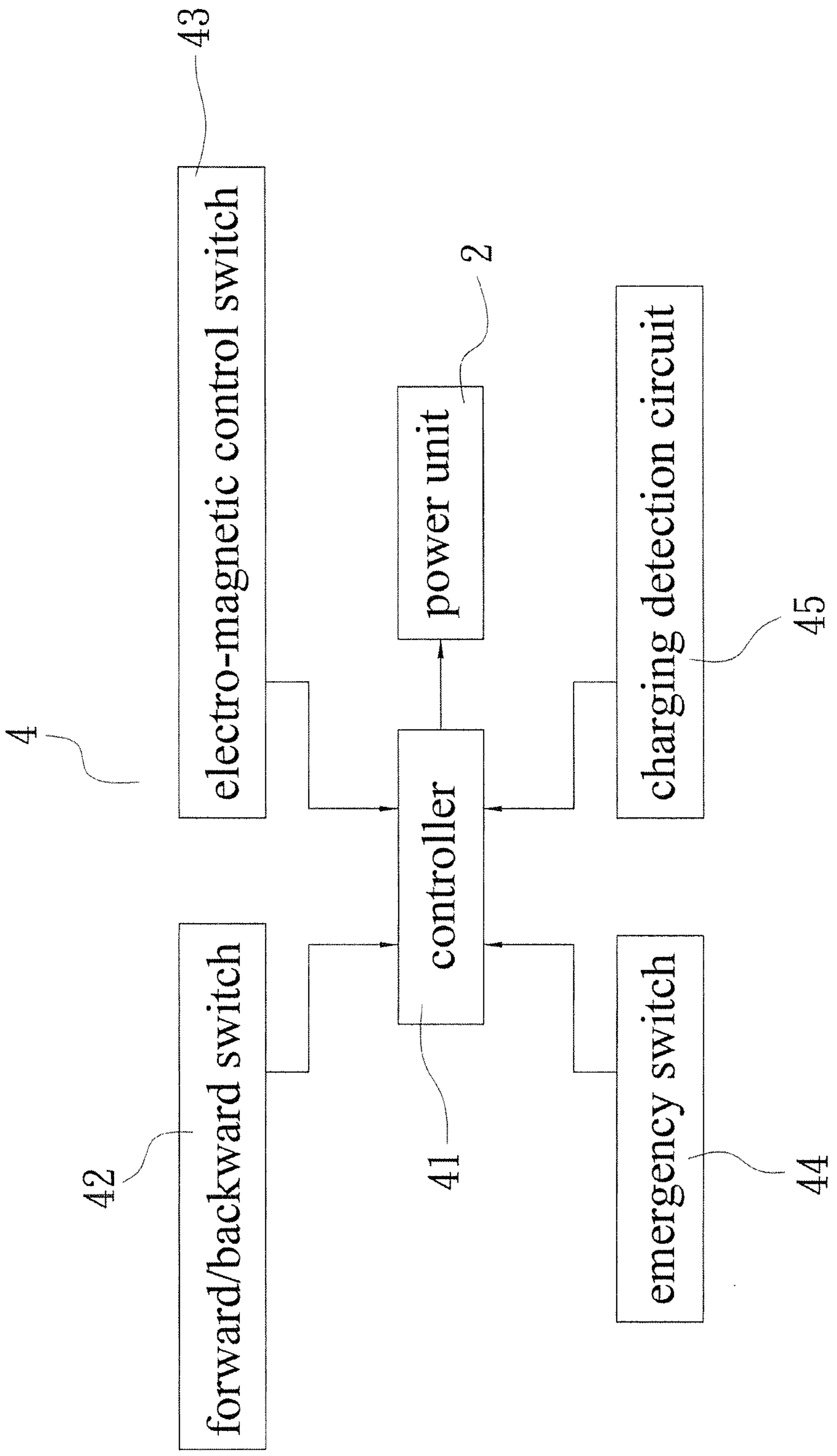
FIG. 10 shows the block diagram of the control unit of the electric moving device of the present invention.

The control unit 4 is electrically connected to the electric motor 21 to activate or de-activate the electric motor 21. As shown in FIG. 10, the control unit 4 has a controller 41, a forward/backward switch 42, an electro-magnetic control switch 43, an emergency switch 44 and a charging detection circuit 45. All of the operation data is stored in the controller 41, when the forward/backward switch 42 sends data to the controller 41, the data is transformed from analog to digital and is then sent the forward/backward commands to the power unit 2 to have corresponding actions. When the moving device 1 encounters an emergency situation, the emergency switch 44 is pressed and the controller 41 sends a stop command to the power unit 2 so that the power unit 2 is stopped. The electro-magnetic control switch 43 controls the output shaft of the electric motor 21 to be engaged with or disengaged from the two active wheels 22. When the output shaft of the electric motor 21 is disengaged from the two active wheels 22, the active wheels 22 freely rotate and the moving device can be moved manually to adjust the position the bed 5. The charging detection circuit 45 detects that the moving device 1 is charging the power supply unit 7, the controller 41 controls the power unit 2 to stop so that the moving device 1 is stopped. This can prevent the users from improperly operating the moving device 1.

Figure 6:
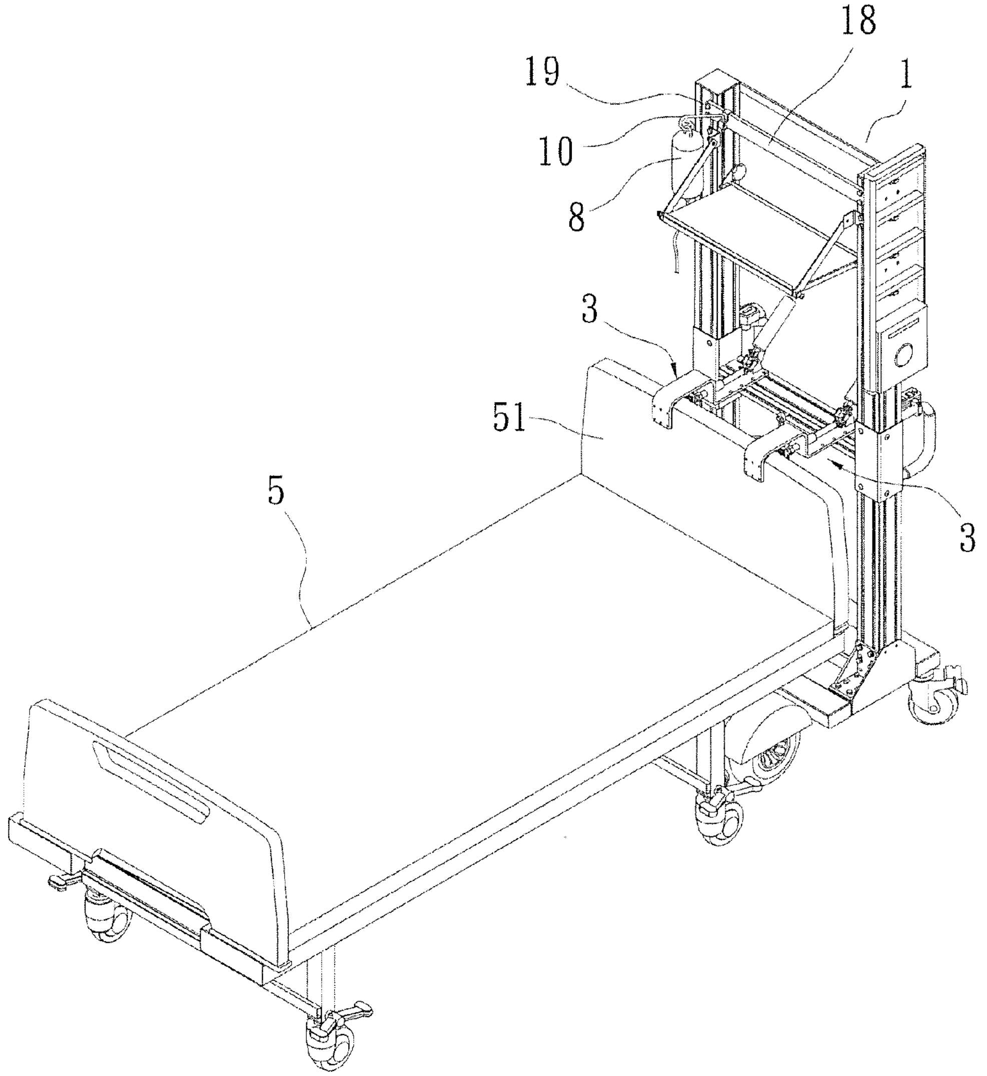
FIG. 6 is a perspective view to show that the electric moving device of the present invention is connected with a bed.

As shown in FIG. 6, when moving the bed 5, the moving device 1 is moved to the front end or the rear end of the bed 5, and the operation member 16 is operated to extend the piston rod 151 from the pneumatic bar 15, and the transverse bar 14 moves upward. The lever 31 is operated to control the second plate 332 to move away from the first plate 331. The transverse bar 14 is then pushed downward to retract the piston rod 151 into the pneumatic bar 15, so that the transverse bar 14 is lowered. When the head board 51 of the bed 5 is located between the first and second plates 331, 332, the lever 31 is operated again to move the second plate 332 toward the first plate 331 until the head board 51 of the bed 5 is clamped between the first and second plates 331, 332. The electric motor 21 is then activated by operating the control unit 4, the active wheels 22 are activated so that the bed 5 is moved to the desired position. The patient is under good medical care during transportation.

Figure 4:
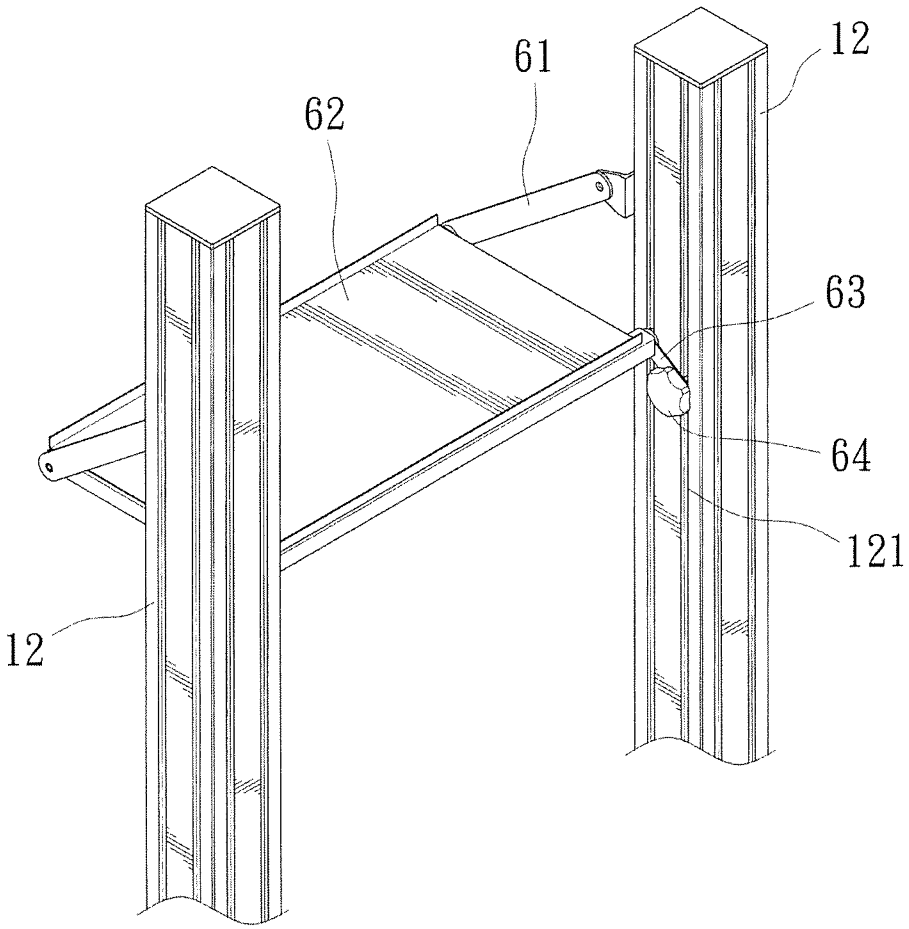
FIG. 4 is a perspective view to show that the board of the electric moving device of the present invention is in extended status.
Figure 5:
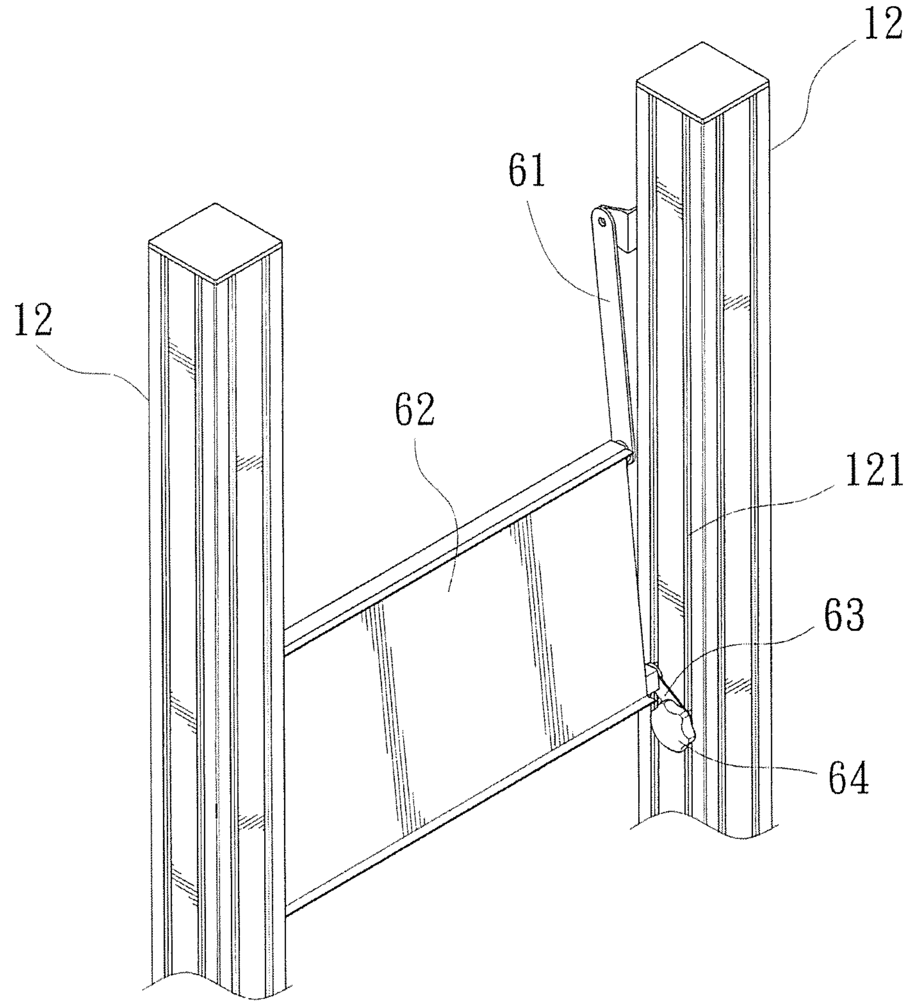
FIG. 5 is a perspective view to show that the board of the electric moving device of the present invention is in folded status.

As shown in FIGS. 1, 4 and 5, two respective first ends of two first links 61 are connected to the two columns 12 respectively. Two respective second ends of the two first links 61 are connected to two ends on one side of a board 62. Two respective first ends of two respective second links 63 are connected to the grooves 121 of the two columns 12 by two respective connection pieces 64 respectively. Two respective second ends of the two second links 63 are connected to the two ends of the other side of the board 62. By unscrewing the connection pieces 64 and changing the positions that the connection pieces 64 are connected to the grooves 121 of the columns 12, the board 62 can be adjusted to be extended status or folded status. The medical personals can put extra medical equipment on the board 62 according to needs. As shown in FIG. 6, a transverse link 18 is connected between the two columns 12. The two ends of the transverse link 18 are connected to the grooves 121 of the two columns 12 by the locking members 19. A hook 10 or the like is connected to the transverse link 18 so as to position a drop bottle 8.

While we have shown and described the embodiment in accordance with the present invention, it should be clear to those skilled in the art that further embodiments may be made without departing from the scope of the present invention.

What is claimed is:

1. An electric moving device comprising:

a support which has two columns on two sides thereof;

at least one power unit having at least one electric motor, two active wheels and two casters, the at least one electric motor having an output shaft connected with the two active wheels, the active wheels and the casters support the electric moving device;

at least one holding unit connected between the two columns and having a lever and a holding member which has a first plate and a second plate, the second plate being controlled by the lever to move toward or away from the first plate, and a control unit electrically connected to the at least one electric motor to activate or de-activate the at least one electric motor.

2. The moving device as claimed in claim 1, wherein each of the two columns has grooves defined therein, two connection units are connected to the grooves of the two columns respectively by two respective locking members, each of the two connection units has a handle, a transverse bar is connected between the two connection units and connected to a first end of the first plate of the at least one holding unit, the lever is pivotably connected to the first plate and a link by two respective shafts, the lever is pivoted about a pivotal position between the lever and the first plate to control the second plate to move toward or away from the first plate by the link.

3. The moving device as claimed in claim 2, wherein a pneumatic bar is connected between the support and the transverse bar, a piston rod of the pneumatic bar is connected to an operation member which controls the piston rod to extend or retract relative to the pneumatic bar so as to control a height of the transverse bar between the two columns.

4. The moving device as claimed in claim 3, wherein the pneumatic bar has a cushion which absorbs shocks.

5. The moving device as claimed in claim 4, wherein a transverse link is connected between the two columns, two ends of the transverse link are connected to the grooves of the two columns by the locking members, and a hooks is connected to the transverse link to position a drop bottle.

6. The moving device as claimed in claim 4, wherein two respective first ends of two first links are connected to the two columns respectively, two respective second ends of the two first links are connected to two ends on one side of a board, two respective first ends of two respective second links are connected to the grooves of the two columns by two respective connection pieces respectively, two respective second ends of the two second links are connected to the two ends of the other side of the board.

7. The moving device as claimed in claim 4, wherein the support has an independent power supply unit.

8. The moving device as claimed in claim 4, wherein the control unit has a controller, a forward/backward switch, an electro-magnetic control switch, an emergency switch and a charging detection circuit.

9. The moving device as claimed in claim 2, wherein the transverse bar has multiple slots and the first plate has multiple locking holes, multiple locking members extend through the locking holes and are connected to the slots to adjust a length that the at least one holding unit extends beyond the transverse bar.

10. The moving device as claimed in claim 2, wherein the link has an adjustment unit which adjusts a distance between the first and second plates, the adjustment unit has threaded holes defined in the link and threaded holes defined in the second plate, a threaded rod has positive threads defined in a first end thereof and negative threads defined in a second end of the threaded rod, the positive threads are connected to the threaded hole of the link, the negative threads are connected to the threaded hole of the second plate, two nuts are respectively connected to the positive and negative threads beyond the threaded holes.

11. The moving device as claimed in claim 1, wherein a transverse link is connected between the two columns, two ends of the transverse link are connected to the grooves of the two columns by the locking members, and a hooks is connected to the transverse link to position a drop bottle.

12. The moving device as claimed in claim 1, wherein two respective first ends of two first links are connected to the two columns respectively, two respective second ends of the two first links are connected to two ends on one side of a board, two respective first ends of two respective second links are connected to the grooves of the two columns by two respective connection pieces respectively, two respective second ends of the two second links are connected to the two ends of the other side of the board.

13. The moving device as claimed in claim 1, wherein the support has an independent power supply unit.

14. The moving device as claimed in claim 1, wherein the control unit has a controller, a forward/backward switch, an electro-magnetic control switch, an emergency switch and a charging detection circuit.

* * * * *